US008207952B2

(12) United States Patent
Kuo et al.

(10) Patent No.: US 8,207,952 B2
(45) Date of Patent: Jun. 26, 2012

(54) PIXEL ARRAY HAVING PIXEL SETS WITH TWO COMMON LINES, METHOD FOR DRIVING THE SAME AND DISPLAY PANEL

(75) Inventors: Jing-Tin Kuo, Taipei (TW); Chao-Liang Lu, Taoyuan County (TW); Kuo-Hsien Lee, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 732 days.

(21) Appl. No.: 12/328,771

(22) Filed: Dec. 5, 2008

(65) Prior Publication Data

US 2010/0079427 A1 Apr. 1, 2010

(30) Foreign Application Priority Data

Sep. 30, 2008 (TW) .................................. 97137588

(51) Int. Cl.
*G06F 3/038* (2006.01)

(52) U.S. Cl. ......................................... 345/204; 345/92

(58) Field of Classification Search .................... 345/92, 345/204

See application file for complete search history.

(56) References Cited

U.S. PATENT DOCUMENTS 5,151,805 A 9/1992 Takeda et al.
5,289,174 A 2/1994 Suzuki
6,778,229 B2 * 8/2004 Inoue et al. .................... 349/39
7,034,501 B1 4/2006 Thunes et al.
2003/0227429 A1 12/2003 Shimoshikiryo
2004/0125066 A1 * 7/2004 Park et al. ....................... 345/92
2005/0122441 A1 6/2005 Shimoshikiryoh
2005/0200788 A1 9/2005 Edwards
2006/0203172 A1 9/2006 Baek et al.
2007/0057297 A1 * 3/2007 Kim ............................ 257/291
2007/0176874 A1 * 8/2007 Yeh ................................ 345/92
2008/0055292 A1 * 3/2008 Do et al. ....................... 345/204
2008/0180370 A1 * 7/2008 Huang et al. .................... 345/87

FOREIGN PATENT DOCUMENTS

TW 200617499 6/2006
TW 200834205 8/2008

* cited by examiner

*Primary Examiner* — Chanh Nguyen
*Assistant Examiner* — Kwang-Su Yang
(74) *Attorney, Agent, or Firm* — Jianq Chyun IP Office

(57) ABSTRACT

A pixel array, a method for driving the same, and a display panel are provided. The pixel array includes a number of pixel sets, each of which includes a first scan line, a second scan line, a data line, a first active device electrically connected to the first scan line and the data line, a second active device electrically connected to the second scan line and the first active device, a first pixel electrode, a second pixel electrode, a first common electrode line, and a second common electrode line. The first pixel electrode and the second pixel electrode are electrically connected to the first active device and the second active device, respectively. The first common electrode line is disposed under the first pixel electrode and electrically connected to a direct current. The second common electrode line is disposed under the second pixel electrode and electrically connected to an alternating current.

41 Claims, 6 Drawing Sheets

210

PIXEL ARRAY HAVING PIXEL SETS WITH TWO COMMON LINES, METHOD FOR DRIVING THE SAME AND DISPLAY PANEL

CROSS-REFERENCE TO RELATED APPLICATION

This application claims the priority benefit of Taiwan application serial no. 97137588, filed on Sep. 30, 2008. The entirety of the above-mentioned patent application is hereby incorporated by reference herein and made a part of this specification.

BACKGROUND OF THE INVENTION

1. Field of the Invention

The present invention relates to a pixel array, a method for driving the aforesaid pixel array, and a display panel. More particularly, the present invention relates to a pixel array capable of simultaneously reducing costs of a driving apparatus and improving display quality, a method for driving the aforesaid pixel array, and a display panel.

2. Description of Related Art

In general, a liquid crystal display (LCD) mainly includes an upper substrate, a lower substrate, and a liquid crystal layer sandwiched between the two substrates. A pixel array is disposed on one of the two substrates, and a region where the pixel array is disposed is a display region for displaying frames. The pixel array is formed by a plurality of pixels arranged in array, and each of the pixels is usually electrically connected to a scan line and a data line for receiving scan signals via the scan line and data signals via the data line. Nonetheless, a gate driving apparatus for providing the scan signals and a source driving apparatus for providing the data signals are expensive. The cost barrier of the source driving apparatus is especially high.

To reduce the costs of the source driving apparatus, a pixel array indicated hereinafter was proposed. As shown in FIG. 1, a pixel array 100 includes a plurality of pixels 110 arranged in array, a plurality of scan lines 112, and a plurality of data lines 114 (only one is shown in FIG. 1 for the purpose of illustration). Each of the pixels 110 includes an active device 116, a pixel electrode 118, and a common electrode line 120. A storage capacitance $C_{st0}$ is generated between the common electrode line 120 and the pixel electrode 118.

It is indicated in FIG. 1 each of the data lines 114 is electrically connected to two columns of pixels 110, and therefore the number of the data lines 114 is half of the column number of the pixels 110, whereby the costs of the source driving apparatus are lowered down. However, two of the scan lines 112 are required for driving each row of the pixels 110. Namely, the number of the scan lines 112 is twice the row number of the pixels 110. As such, more gate driving apparatuses are needed, and relevant costs are increased. Moreover, an aperture ratio (AR) of each of the pixel array 100 is further reduced.

SUMMARY OF THE INVENTION

The present invention is directed to a pixel array designed not only for reducing costs and the required number of driving apparatuses but also for improving display frame quality.

The present invention is further directed to a display panel including the aforesaid pixel array. Thereby, costs of driving apparatuses can be reduced without sacrificing display quality.

The present invention is further directed to a method for driving a pixel array. By conducting the method, the aforesaid display panel can be driven.

To embody the present invention, a pixel array is provided herein. The pixel array includes a plurality of pixel sets disposed on a substrate. Each of the pixel sets includes a first scan line, a second scan line, a data line, a first active device, a second active device, a first pixel electrode, a second pixel electrode, a first common electrode line, and a second common electrode line. The first scan line and the second scan line are arranged in parallel, and the data line is perpendicular to the first scan line and the second scan line. The first active device is electrically connected to the first scan line and the data line, and the second active device is electrically connected to the second scan line and the first active device. The first pixel electrode is electrically connected to the first active device, and the second pixel electrode is electrically connected to the second active device. The first common electrode line is disposed under the first pixel electrode and electrically connected to a direct current, and a first storage capacitance is generated between the first common electrode line and the first pixel electrode. The second common electrode line is disposed under the second pixel electrode and electrically connected to an alternating current, and a second storage capacitance is generated between the second common electrode line and the second pixel electrode.

To embody the present invention, a display panel is further provided herein. The display panel includes a first substrate, a second substrate, and a display medium. A pixel array including a plurality of pixel sets is disposed on the first substrate. Each of the pixel sets includes a first scan line, a second scan line, a data line, a first active device, a second active device, a first pixel electrode, a second pixel electrode, a first common electrode line, and a second common electrode line. The first scan line and the second scan line are arranged in parallel, and the data line is perpendicular to the first scan line and the second scan line. The first active device is electrically connected to the first scan line and the data line, and the second active device is electrically connected to the second scan line and the first active device. The first pixel electrode is electrically connected to the first active device, and the second pixel electrode is electrically connected to the second active device. The first common electrode line is disposed under the first pixel electrode and electrically connected to a direct current, and a first storage capacitance is generated between the first common electrode line and the first pixel electrode. The second common electrode line is disposed under the second pixel electrode and electrically connected to an alternating current, and a second storage capacitance is generated between the second common electrode line and the second pixel electrode. The second substrate is disposed opposite to the first substrate, and the display medium is sandwiched between the first substrate and the second substrate.

In one embodiment of the present invention, a drain of the first active device is electrically connected to a source of the second active device.

In one embodiment of the present invention, the aforesaid display panel and the aforesaid pixel array further include a connection line electrically connecting a drain of the first active device and a source of the second active device. Besides, the connection line is located between the first pixel electrode and the second pixel electrode.

In one embodiment of the present invention, the first common electrode line includes a first common line and a plurality of first branches connected to the first common line. The first common line is arranged in parallel to the first scan line substantially, and the first branches are perpendicular to the first common line. The second common electrode line includes a second common line and a plurality of second branches connected to the second common line. The second common line is arranged in parallel to the second scan line substantially, and the second branches are perpendicular to the second common line. In one embodiment of the present invention, the first branches are overlapped with the first pixel electrode but not overlapped with the second pixel electrode. In another embodiment of the present invention, the second branches are overlapped with the second pixel electrode but not overlapped with the first pixel electrode.

In one embodiment of the present invention, the aforesaid display panel and the aforesaid pixel array further include at least a first main line and at least a second main line. The at least a first main line disposed at an edge of the substrate is electrically connected to the first common electrode lines and the direct current. The at least a second main line disposed at another edge of the substrate is electrically connected to the second common electrode lines and the alternating current. In one embodiment of the present invention, the at least a first main line and the at least a second main line are formed in a film layer, and the first common electrode lines and the second common electrode lines are formed in another film layer. In another embodiment of the present invention, the at least a first main line and the first common electrode lines are formed in a film layer, and the at least a second main line and the second common electrode lines are formed in another film layer. In still another embodiment of the present invention, the at least a first main line, the first common electrode lines, and the second common electrode lines are formed in a film layer, and the at least a second main line is formed in another film layer.

To embody the present invention, a method for driving a pixel array is provided herein, which is suitable for driving the aforesaid pixel array. The method includes inputting a direct voltage to the first common electrode line and inputting an alternating voltage to the second common electrode line. The second active device is turned on, and the second pixel electrode is charged. Here, a waveform of the alternating voltage at the second common electrode line is converted from a high voltage level to a low voltage level. The second active device is then turned off, and the waveform of the alternating voltage at the second common electrode line is converted from the low voltage level to the high voltage level.

In one embodiment of the present invention, the alternating voltage at the first common electrode line is adjustable.

In one embodiment of the present invention, an oscillation range of the alternating voltage is from about −10V to about 10V. In one preferred embodiment of the present invention, the oscillation range of the alternating voltage is from about 2.3V to about 3.7V.

According to the present invention, each of the pixel sets in the display panel and the pixel array thereof includes two common electrode lines. By conducting the method for driving the pixel array of the present invention, the two common electrode lines respectively receive the direct voltage and the alternating voltage. Here, the alternating voltage at the common electrode line is conducive to rectification of defective frames caused by voltage coupling effects between the two active devices. Specifically, different feed-through voltages $$\Delta V = \frac{(V_{gh} - V_{gl}) \cdot C_{gs}}{C_{gs} + C_{lc} + C_{st}},$$

where $V_{gh}$ is gate voltage of the active device at high voltage level, $V_{gl}$ is gate voltage of the active device at low voltage level, $C_{gs}$ is capacitance between gate and source of the active device, $C_{lc}$ is capacitance of the display medium between common electrode of the second substrate and the pixel electrode of the first substrate, and $C_{st}$ is the storage capacitance of the pixel unit) at the two pixel electrodes in each of the pixel sets result in different voltage levels of the pixel sets. Thereby, display brightness of the two pixel electrodes is different, which gives rise to the defective frames.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
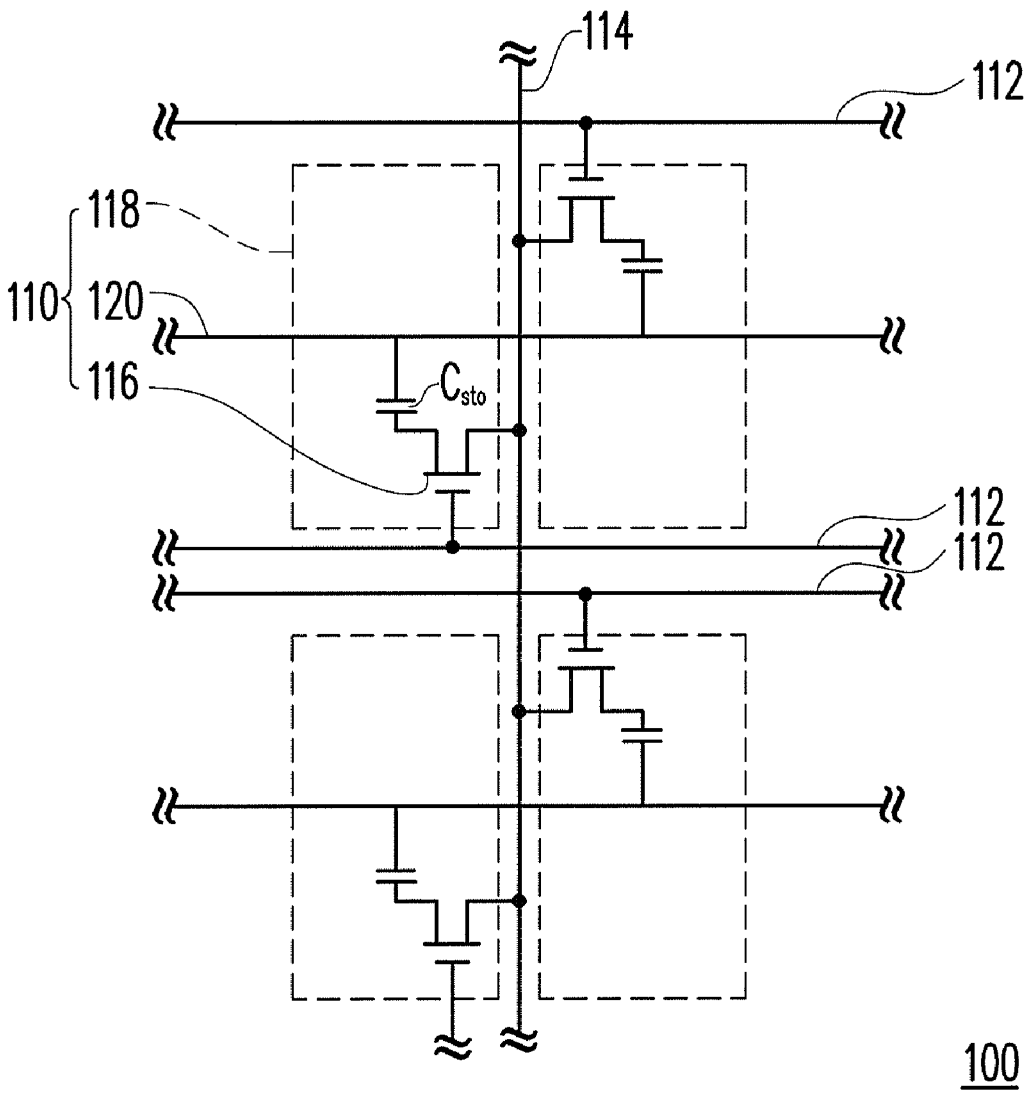
FIG. 1 (PRIOR ART)
FIG. 1 is an equivalent circuit diagram of a conventional pixel array.
Figure 2:
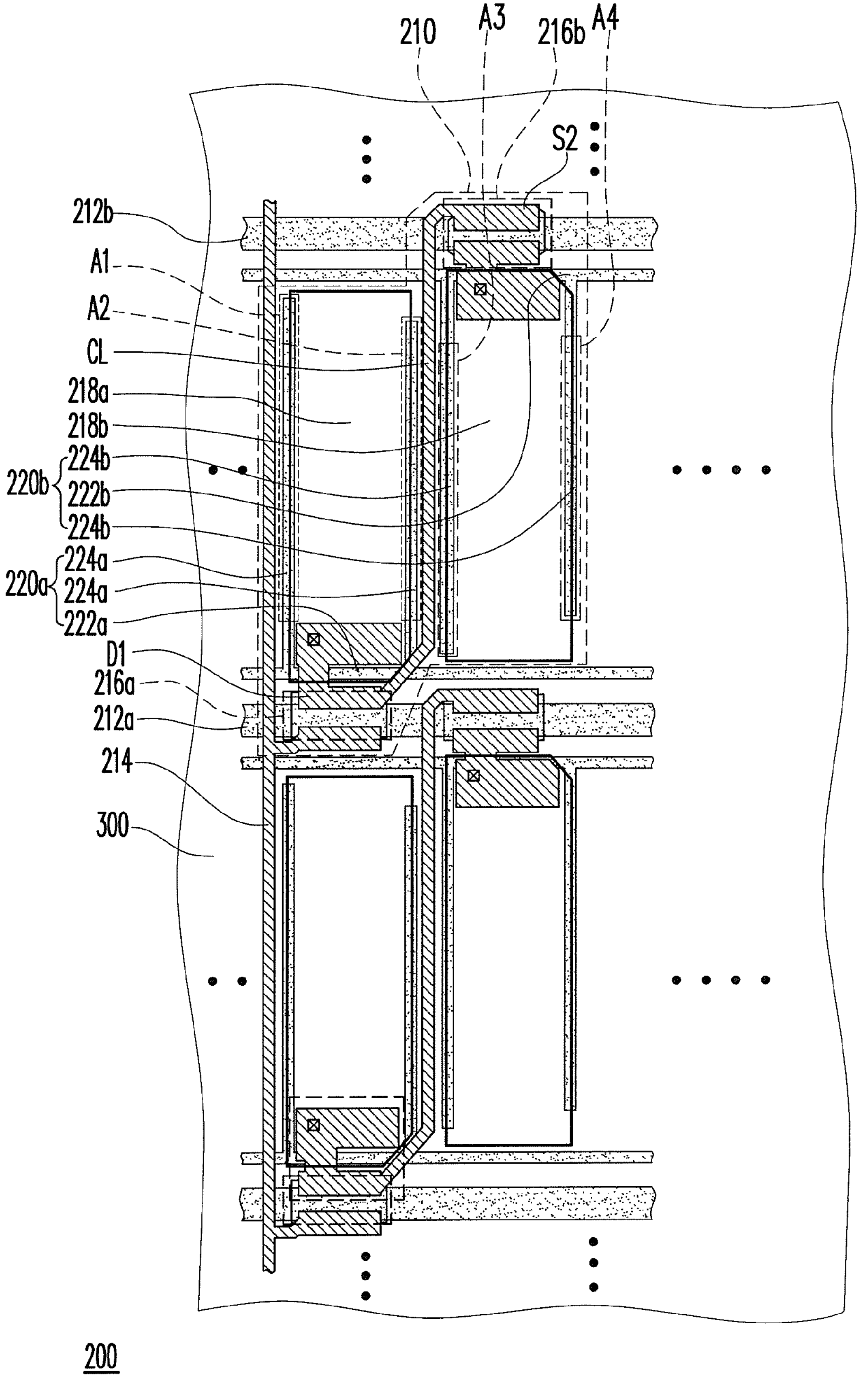
FIG. 2 is a schematic view of a pixel array according to an embodiment of the present invention.
Figure 3:
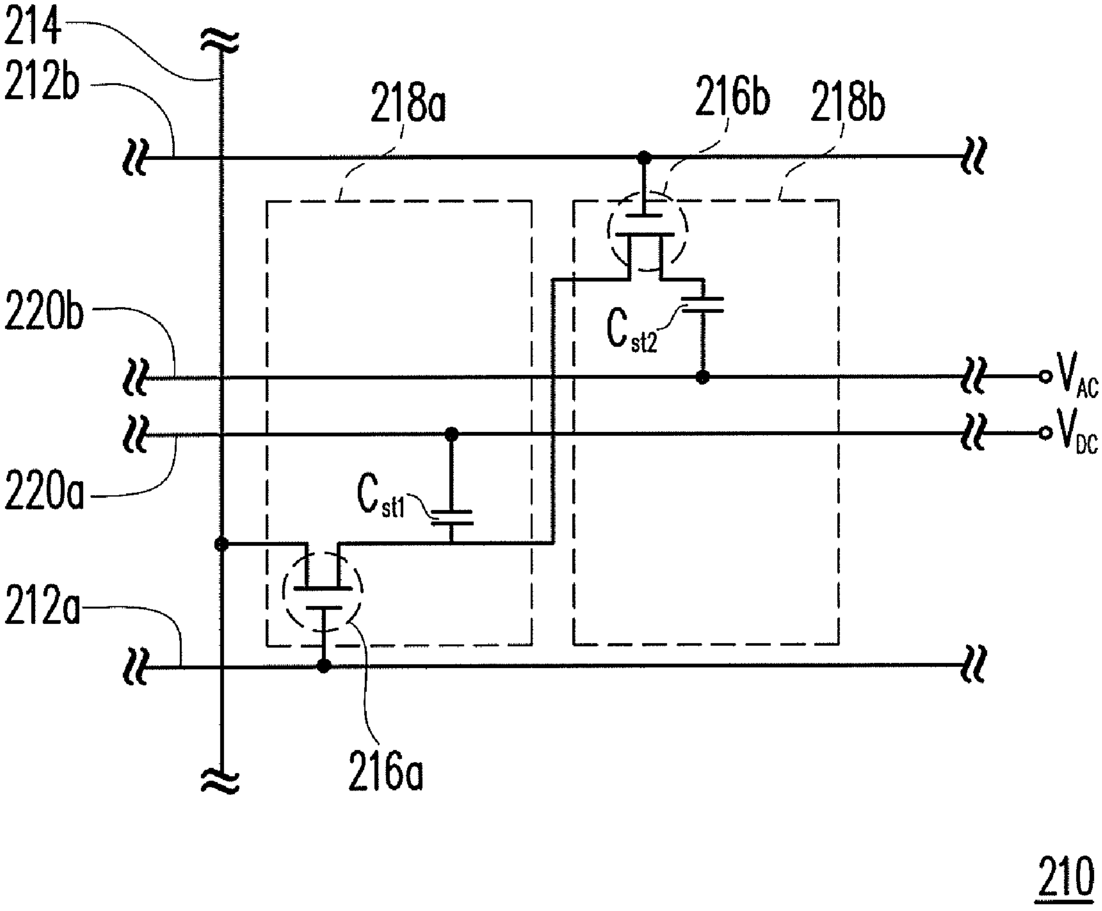
FIG. 3 is an equivalent circuit diagram of a pixel set illustrated in FIG. 2.

FIG. 2 is a schematic view of a pixel array according to an embodiment of the present invention. FIG. 3 is an equivalent circuit diagram of a pixel set illustrated in FIG. 2. Referring to FIGS. 2 and 3, a pixel array 200 of the present embodiment includes a plurality of pixel sets 210 disposed on a substrate 300. The pixel sets 210 are, for example, arranged in a stripe-type manner and each has two pixel units. Each of the pixel sets 210 includes a first scan line 212a, a second scan line 212b, a data line 214, a first active device 216*a*, a second active device 216*b*, a first pixel electrode 218*a*, a second pixel electrode 218*b*, a first common electrode line 220*a*, and a second common electrode line 220*b*. For one pixel set 210, first pixel electrode 218*a* corresponds to one pixel unit, while second pixel electrode 218*b* corresponds to another pixel unit. In the present embodiment, the first scan line 212*a* and the second scan line 212*b* are, for example, formed by a first metal layer. The data line 214 is, for example, formed by a second metal layer. The first common electrode line 220*a* and the second common electrode line 220*b* are, for example, formed by a transparent conductive layer disposed above the first metal layer and the second metal layer. The second metal layer is located between the first metal layer and the transparent conductive layer. However, in another embodiment, the data line 214 can also be formed by the first metal layer, and the first scan line 212*a* and the second scan line 212*b* are formed by the second metal layer.

The first scan line 212*a* and the second scan line 212*b* are arranged in parallel, and the data line 214 is perpendicular to the first scan line 212*a* and the second scan line 212*b*. Here, the first active device 216*a* is electrically connected to the first scan line 212_a_ and the data line 214, and the second active device 216_b_ is electrically connected to the second scan line 212_b_ and the first active device 216_a_. In the present embodiment, a drain D1 of the first active device 216_a_ is electrically connected to a source S2 of the second active device 216_b_, such that the second active device 216_b_ is electrically connected to the first active device 216_a_. As shown in FIG. 2, a connection line CL disposed between the first pixel electrode 218_a_ and the second pixel electrode 218_b_ is used for electrically connecting the drain D1 of the first active device 216_a_ and the source S2 of the second active device 216_b_. Thereby, the second active device 216_b_ can be electrically connected to the data line 214 through the first active device 216_a_. Additionally, the first pixel electrode 218_a_ is electrically connected to the first active device 216_a_, and the second pixel electrode 218_b_ is electrically connected to the second active device 216_b_. Namely, the first pixel electrode 218_a_ can receive data signals via the data line 214 and the first active device 216_a_, and the second pixel electrode 218_b_ can receive data signals via the data line 214 and the second active device 216_b_.

Given that each of the pixel electrodes is driven by one data line for receiving the data signals on the data line, costs of source driving apparatuses for providing the data signals to the data line are increased together with the increased number of the data line. Based on the above, the first pixel electrode 218_a_ and the second pixel electrode 218_b_ in one of the pixel sets 210 can be driven by one data line 214 in the present embodiment, which is conducive to cost reduction of the source driving apparatuses.

According to the present embodiment, the first common electrode line 220_a_ is disposed under the first pixel electrode 218_a_, and the second common electrode line 220_b_ is disposed under the second pixel electrode 218_b_. The first common electrode line 220_a_ and the second common electrode line 220_b_ are, for example, formed by the first metal layer. A first storage capacitance $C_{st1}$ generated between the first common electrode line 220_a_ and the first pixel electrode 218_a_ is able to maintain a value of the voltage applied to the first pixel electrode 218_a_, and a second storage capacitance $C_{st2}$ generated between the second common electrode line 220_b_ and the second pixel electrode 218_b_ is able to maintain a value of the voltage applied to the second pixel electrode 218_b_.

Besides, in the present embodiment, the first common electrode line 220_a_ further includes a first common line 222_a_ and a plurality of first branches 224_a_ connected to the first common line 222_a_, and the second common electrode line 220_b_ further includes a second common line 222_b_ and a plurality of second branches 224_b_ connected to the second common line 222_b_. Here, the first common line 222_a_ is arranged in parallel to the first scan line 212_a_ substantially, and the first branches 224_a_ are perpendicular to the first common line 222_a_. In addition, the second common line 222_b_ is arranged in parallel to the second scan line 212_b_ substantially, and the second branches 224_b_ are perpendicular to the second common line 222_b_. In the present embodiment, the first branches 224_a_ are overlapped with the first pixel electrode 218_a_ but not overlapped with the second pixel electrode 218_b_, and the second branches 224_b_ are overlapped with the second pixel electrode 218_b_ but not overlapped with the first pixel electrode 218_a_.

Note that no light leakage would occur in regions A1 and A2 where the first branches 224_a_ and the first pixel electrode 218_a_ are overlapped. Likewise, light leakage can also be prevented in regions A3 and A4 where the second branches 224_b_ and the second pixel electrode 218_b_ are overlapped.

When the scan signals on the first scan line 212_a_ turn on the first active device 216_a_, the data line 214 can charge the first pixel electrode 218_a_, and the data signals on the data line 214 can be received by the first pixel electrode 218_a_ during the charging period. Thereafter, the scan signals on the first scan line 212_a_ turn off the first active device 216_a_ to finish the charging operation. Theoretically, after the first pixel electrode 218_a_ is charged but before the first active device 216_a_ is turned on again, the first storage capacitance $C_{st1}$ can maintain the voltage value of the first pixel electrode 218_a_ to be a voltage value corresponding to the data signals. However, when the first active device 216_a_ is turned off, the scan signals result in a voltage coupling effect occurring in the first pixel electrode 218_a_, and thereby the voltage value of the first pixel electrode 218_a_ is slightly decreased.

On the other hand, the second active device 216_b_ of the present embodiment is electrically connected to the data line 214 through the first active device 216_a_. In other words, the data line 214 can charge the second pixel electrode 218_b_ only when the first active device 216_a_ and the second active device 216_b_ are turned on at the same time. Besides, if the first active device 216_a_ is turned off during the charging period, the voltage coupling effect occurs in the first pixel electrode 218_a_ and the second pixel electrode 218_b_ when the first active device 216_a_ is turned off by the first scan line 212_a_, such that the voltage values of the first pixel electrode 218_a_ and the second pixel electrode 218_b_ are both reduced slightly. After that, the second active device 216_b_ is turned off, and the charging period ends. Theoretically, after the second pixel electrode 218_b_ is charged but before the second active device 216_b_ is charged again, the second storage capacitance $C_{st2}$ can maintain the voltage value of the second pixel electrode 218_b_ to be a voltage value corresponding to the data signals. However, when the second active device 216_b_ is turned off, the scan signals result in the voltage coupling effect occurring in the second pixel electrode 218_b_, and thereby the voltage value of the second pixel electrode 218_b_ is slightly decreased again.

In light of the foregoing, the voltage value of the first pixel electrode 218_a_ is only reduced when the first active device 216_a_ is turned off. By contrast, the voltage value of the second pixel electrode 218_b_ is reduced twice when the first active device 216_a_ and the second active device 216_b_ are turned off, respectively. That is to say, after the first pixel electrode 218_a_ and the second pixel electrode 218_b_ are charged, the voltage values of the first pixel electrode 218_a_ and the second pixel electrode 218_b_ are different, and thus a voltage difference between the first pixel electrode 218_a_ and the first common electrode line 220_a_ is different from a voltage difference between the second pixel electrode 218_b_ and the second common electrode line 220_b_. To resolve said issue, the voltage level of the second common electrode line 220_b_ is lowered down when the second pixel electrode 218_b_ starts to be charged according to the present embodiment. After the second pixel electrode 218_b_ is charged, even though the voltage value of the second pixel electrode 218_b_ is affected by the first active device 216_a_ and the second active device 216_b_, and the voltage value of the second pixel electrode 218_b_ is still decreased, the loss of the voltage difference between the second pixel electrode 218_b_ and the second common electrode line 220_b_ is significantly reduced.

In the present embodiment, referring to FIG. 3 and the above descriptions, the first common electrode line 220_a_ is electrically connected to a direct current $V_{DC}$, and the second common electrode line 220_b_ is electrically connected to an alternating current $V_{AC}$. Signal waveforms are further provided hereinafter to elaborate a method for driving the pixel sets 210 of the present embodiment.

Figure 4:
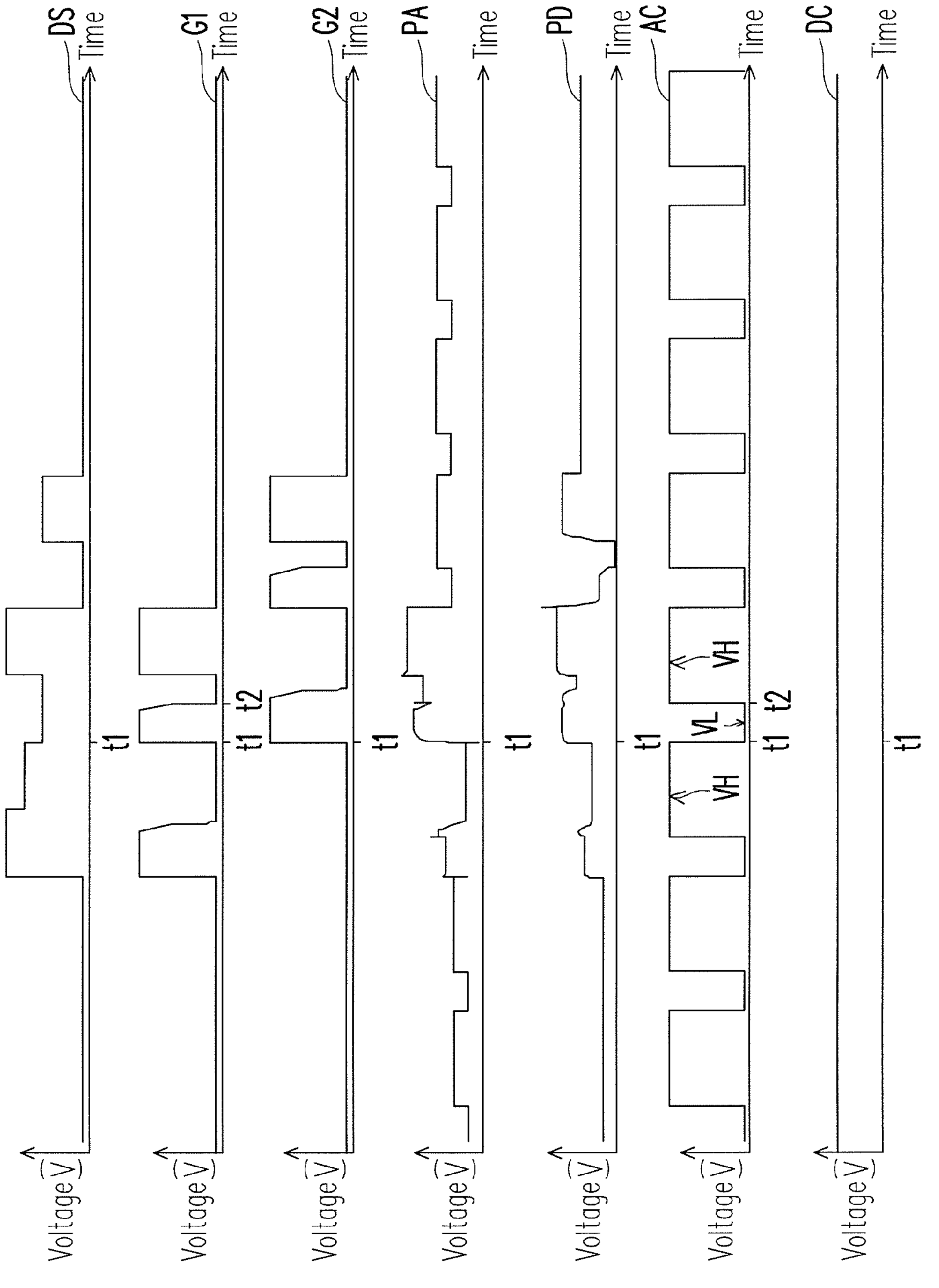
FIG. 4 is a diagram showing a driving waveform of a pixel set according to an embodiment of the present invention.

FIG. 4 is a diagram showing a driving waveform of a pixel set according to an embodiment of the present invention. Here, DS represents a data signal waveform of the data line 214, G1 represents a scan signal waveform of the second scan line 212*b*, G2 represents a scan signal waveform of the first scan line 212*a*, PA represents a voltage waveform of the second pixel electrode 218*b*, PD represents a voltage waveform of the first pixel electrode 218*a*, AC represents an alternating voltage waveform of the second common electrode line 220*b*, and DC represents a direct voltage waveform of the first common electrode line 220*a*. Referring to FIG. 4, in the present embodiment, a direct current voltage value of the first common electrode line 220*a* is, for example, about 3.30V. Relationships among other signal waveforms are explained below.

At time t1, the scan signals on the first scan line 212*a* and the second scan line 212*b* respectively turn on the first active device 216*a* and the second active device 216*b*. The alternating signal waveform AC of the second common electrode line 220*b* is now converted from a high voltage level VH to a low voltage level VL, and the data line 214 starts to charge the first pixel electrode 218*a* and the second pixel electrode 218*b*. Here, the high voltage level VH is, for example, about 3.60V, while the low voltage level VL is, for example, about 2.65V. During the charging period, a target voltage value to be obtained by the second pixel electrode 218*b* is the voltage value corresponding to the data signals. Besides, the voltage difference between the second pixel electrode 218*b* and the second common electrode line 220*b* is increased to be a voltage difference between the voltage value corresponding to the data signals and the low voltage level VL.

Next, at time t2, the scan signals on the second scan line 212*b* turn off the second active device 216*b*, such that the data line 214 stops charging the second pixel electrode 218*b*. The alternating signal waveform AC of the second common electrode line 220*b* is now converted from the low voltage level VL to the high voltage level VH. In accordance with the law of conservation of electric charges, the voltage difference between the voltage value corresponding to the data signals and the low voltage level VL should remain unchanged after the second active device 216*b* is turned off. As such, the alternating signal waveform AC of the second common electrode line 220*b* at the high voltage level VH gives rise to an increase in the voltage value of the second pixel electrode 218*b*. Besides, when the second active device 216*b* is turned off (at the time t2), the slightly reduced voltage value of the second pixel electrode 218*b* can be compensated.

In a preferred embodiment, when an oscillation range of the alternating voltage between the low voltage level VL and the high voltage level VH on the first common electrode line 220*a* is from about −10V to about 10V, preferably from about 2.3V to about 3.7V, the voltage value of the second pixel electrode 218*b* can be compensated to a better degree. However, the values of the low voltage level VL and the high voltage level VH merely serve as examples in the present embodiment, and the configuration of the alternating voltage applied to the first common electrode line 220*a* is determined upon actual demands on products. Namely, in the present invention, the above-exemplified alternating voltage applied to the first common electrode line 220*a* is adjustable.

Figure 5:
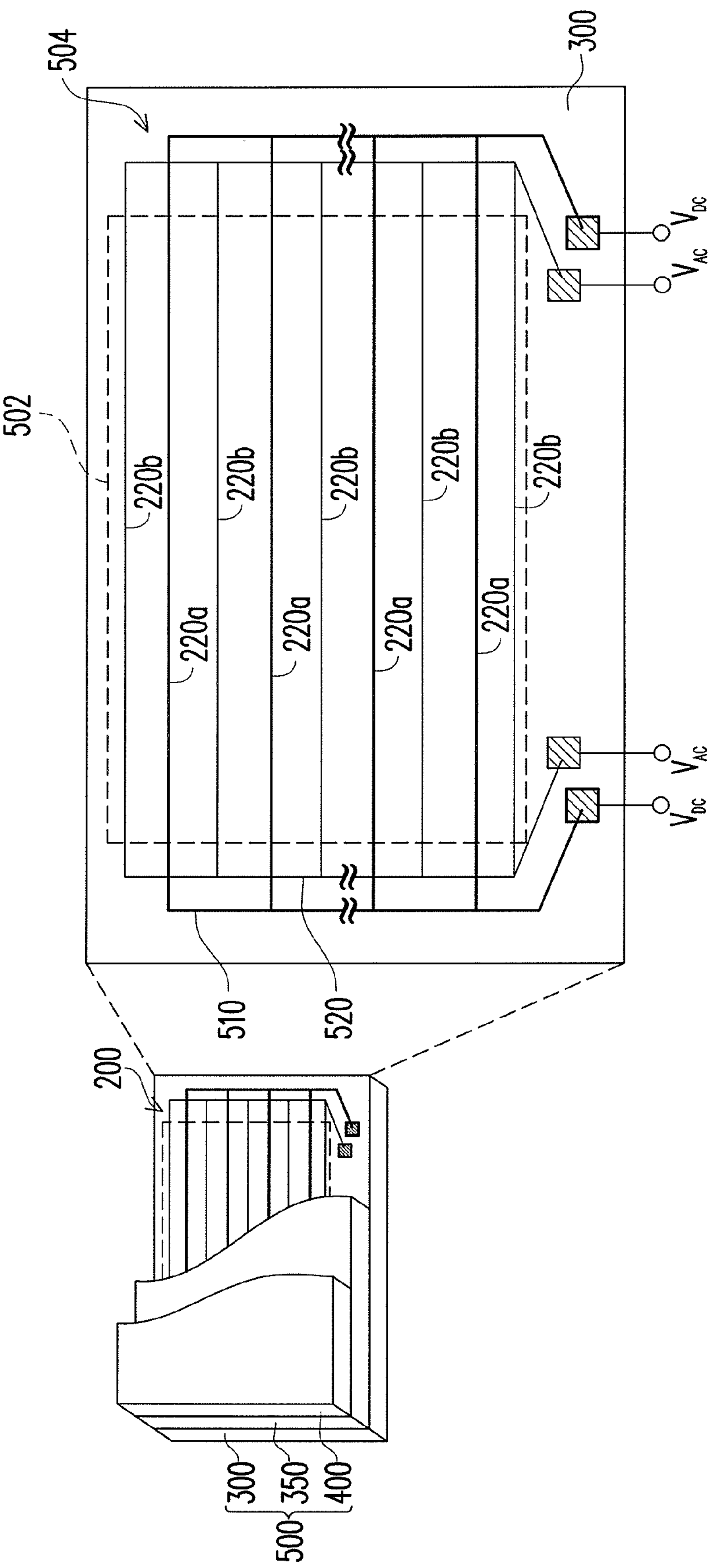
FIG. 5 is a schematic view of a display panel according to an embodiment of the present invention.

FIG. 5 is a schematic view of a display panel according to an embodiment of the present invention. Referring to FIG. 5, a display panel 500 of the present embodiment includes a substrate 300, another substrate 400, and a display medium 350. The substrate 400 is disposed opposite to the substrate 300, and the display medium 350 is sandwiched between the substrate 300 and the substrate 400. Referring to FIGS. 2 and 5, the substrate 300 includes a pixel array 200 disposed thereon. The pixel array 200 includes a plurality of pixel sets 210. In general, the substrate 400 has a common electrode (not shown). For instance, when liquid crystals are used as the display medium 350, the voltage difference between the first and second pixel electrodes 220*a* and 220*b* and the common electrode determines arrangement of liquid crystal molecules, so as to allow the display panel 500 to display frames. Since other layouts, designs, and relevant descriptions of the pixel array 200 and the pixel sets 210 thereof are provided in FIGS. 2~4.

As indicated in FIG. 5, the display panel 500 of the present embodiment further includes at least a first main line 510 and at least a second main line 520, while only two first main lines 510 and two second main lines 520 are depicted in FIG. 5. Referring to FIGS. 2 and 5, in the present embodiment, the first main lines 510 and the second main lines 520 are disposed at the edges of the substrate 300. To be more specific, a region occupied by the pixel array 200 on the display panel 500 is defined as a display region 502, and the other region on the display panel 500 is defined as a peripheral circuit region 504. In comparison with the display region 502, the peripheral circuit region 504 is closer to the edges of the substrate 300, and the first main lines 510 and the second main lines 520 of the present embodiment are disposed in the peripheral circuit region 504 relatively adjacent to the edges of the substrate 300. Here, the data signals on the data line 214 and the scan signals on the first and second scan lines 212*a* and 212*b* in the display region 502 can be provided by the peripheral circuit region 504.

Based on the above, in the present embodiment, the first main lines 510 are electrically connected to the first common electrode lines 220*a* which is electrically connected to the direct current $V_{DC}$. The second main lines 520 are electrically connected to the second common electrode lines 220*b* which is electrically connected to the alternating current $V_{AC}$. That is to say, in the pixel sets 210, the first common electrode lines 220*a* can be electrically connected to the direct current $V_{DC}$ through the first main lines 510, and the second common electrode lines 220*b* can be electrically connected to the alternating current $V_{AC}$ through the second main lines 520.

In the present embodiment, the first common electrode lines 220*a* and the second common electrode lines 220*b* are formed in one film layer (e.g. the first metal layer), and the first main lines 510 and the second main lines 520 are formed in another film layer (e.g. the second metal layer). Here, the first common electrode lines 220*a* and the second common electrode lines 220*b* formed in the same film layer are not contacted, and neither are the first main lines 510 and the second main lines 520 formed in the same film layer. However, in another embodiment, the first main lines 510 and the first common electrode lines 220*a* can be formed in one film layer, and the second main lines 520 and the second common electrode lines 220*b* are formed in another film layer. In an alternative, the first main lines 510, the first common electrode lines 220*a*, and the second common electrode lines 220*b* are formed in one film layer, and the second main lines 520 are formed in another film layer. The first main lines 510, the first common electrode lines 220*a*, and the second common electrode lines 220*b* formed in the same film layer are not contacted. To sum up, whether the first main lines 510, the second main lines 520, the first common electrode lines 220*a*, and the second common electrode lines 220*b* are formed in the same film layer or not is determined upon actual demands on products, which is not limited in the present invention.

Moreover, according to another embodiment of the preset invention, the pixel sets can be designed as indicated in FIG.

Figure 6:
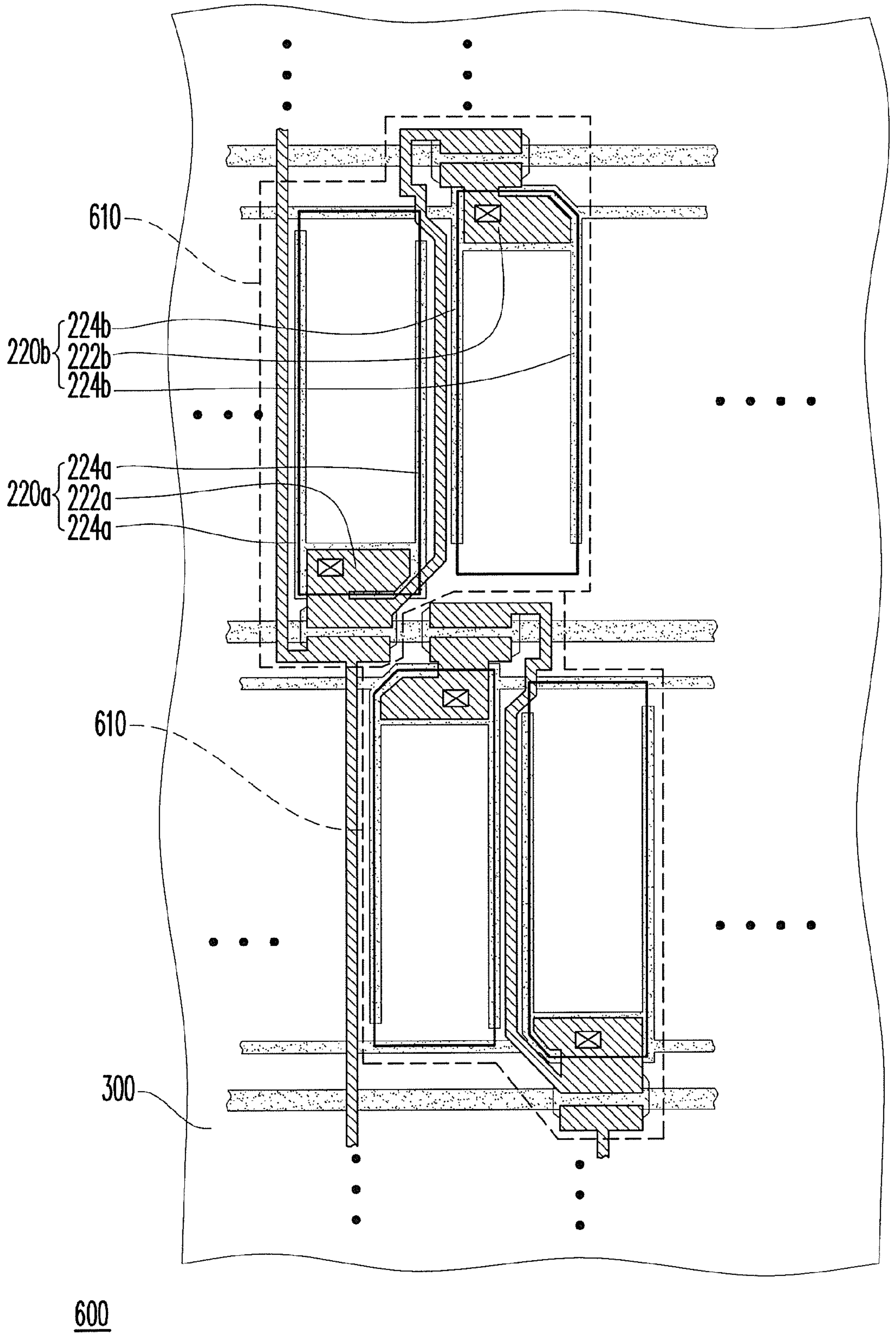
FIG. 6 is a schematic view of a pixel array according to another embodiment of the present invention.

6. Referring to FIG. 6, pixel sets 610 are similar to the pixel sets 210 of FIG. 2, while the difference therebetween lies in that the pixel sets 610 are arranged in a delta-type manner. Since the components of the pixel sets 610 are similar to those of the pixel sets 210, no further descriptions are provided herein. Note that the pixel sets arranged in different ways are irrelevant to the spirits of the present invention. Namely, the arrangement of the pixel sets should not be construed as a limitation to the present invention.

The designs of the display panel and the pixel array thereof in the present invention contribute to the reduction of the costs and the required number of driving apparatuses. Moreover, each of the pixel sets in the pixel array includes two common electrode lines. By conducting the method for driving the pixel array of the present invention, the two common electrode lines respectively receive the direct voltage and the alternating voltage. Here, the alternating voltage at the common electrode line is conducive to rectification of defective frames caused by the voltage coupling effects between the two active devices. Specifically, different feed-through voltages $$\Delta V = \frac{(V_{gh} - V_{gl}) \cdot C_{gs}}{C_{gs} + C_{lc} + C_{st}},$$

where $V_{gh}$ is gate voltage of the active device at high voltage level, $V_{gl}$ is gate voltage of the active device at low voltage level, $C_{gs}$ is capacitance between gate and source of the active device, $C_{lc}$ is capacitance of the display medium between common electrode of the second substrate and the pixel electrode of the first substrate, and $C_{st}$ is the storage capacitance of the pixel unit (each pixel set has two pixel units)) at the two pixel electrodes in each of the pixel sets result in different voltage levels of the pixel sets. Thereby, display brightness of the two pixel electrodes is different, which gives rise to the defective frames. In brief, the costs and the required number of driving apparatuses can be reduced together with improvement of display frame quality according to the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array, comprising a plurality of pixel sets disposed on a substrate, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the substrate, wherein the first common electrode line is electrically connected to the at least a first main line, and the at least a first main line is electrically connected to the direct current; and at least a second main line disposed at another edge of the substrate, wherein the second common electrode line is electrically connected to the at least a second main line, and the at least a second main line is electrically connected to the alternating current, wherein the at least a first main line and the at least a second main line are formed in a film layer, and the first common electrode lines and the second common electrode lines are formed in another film layer.

2. The pixel array of claim 1, wherein a drain of the first active device is electrically connected to a source of the second active device.

3. The pixel array of claim 1, further comprising a connection line electrically connecting a drain of the first active device and a source of the second active device, the connection line being located between the first pixel electrode and the second pixel electrode.

4. The pixel array of claim 1, wherein:

the first common electrode line comprises a first common line and a plurality of first branches connected to the first common line, the first common line being arranged substantially in parallel to the first scan line, the plurality of first branches being perpendicular to the first common line; and the second common electrode line comprises a second common line and a plurality of second branches connected to the second common line, the second common line being arranged substantially in parallel to the second scan line, the plurality of second branches being perpendicular to the second common line.

5. The pixel array of claim 4, wherein the plurality of first branches and the first pixel electrode are at least overlapped, while the plurality of first branches and the second pixel electrode are not overlapped.

6. The pixel array of claim 4, wherein the plurality of second branches and the second pixel electrode are at least overlapped, while the plurality of second branches and the first pixel electrode are not overlapped.

7. A method for driving the pixel array of claim 1, the method comprising:

inputting a direct voltage to the first common electrode line and inputting an alternating voltage to the second common electrode line;

turning on the second active device and charging the second pixel electrode, wherein a waveform of the alternating voltage at the second common electrode line is converted from a high voltage level to a low voltage level; and turning off the second active device, wherein the waveform of the alternating voltage at the second common electrode line is converted from the low voltage level to the high voltage level.

8. The method of claim 7, wherein the alternating voltage at the first common electrode line is adjustable.

9. The method of claim 7, wherein an oscillation range of the alternating voltage is from about −10V to about 10V.

10. A display panel, comprising:

a first substrate comprising a pixel array disposed thereon, the pixel array comprising a plurality of pixel sets, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the first substrate, wherein the first common electrode line is electrically connected to the at least a first main line, and the at least a first main line is electrically connected to the direct current; and at least a second main line disposed at another edge of the first substrate, wherein the second common electrode line is electrically connected to the at least a second main line, and the at least a second main line is electrically connected to the alternating current, wherein the at least a first main line and the at least a second main line are formed in a film layer, and the first common electrode lines and the second common electrode lines are formed in another film layer;

a second substrate disposed opposite to the first substrate; and a display medium, sandwiched between the first substrate and the second substrate.

11. The display panel of claim 10, wherein a drain of the first active device is electrically connected to a source of the second active device.

12. The display panel of claim 10, further comprising a connection line electrically connected with a drain of the first active device and a source of the second active device, the connection line being located between the first pixel electrode and the second pixel electrode.

13. The display panel of claim 10, wherein:

the first common electrode line comprises a first common line and a plurality of first branches connected to the first common line, the first common line being arranged substantially in parallel to the first scan line, the plurality of first branches being substantially perpendicular to the first common line; and the second common electrode line comprises a second common line and a plurality of second branches connected to the second common line, the second common line being arranged substantially in parallel to the second scan line, the plurality of second branches being substantially perpendicular to the second common line.

14. The display panel of claim 13, wherein the plurality of first branches and the first pixel electrode are at least overlapped, while the plurality of first branches and the second pixel electrode are not overlapped.

15. The display panel of claim 13, wherein the plurality of second branches and the second pixel electrode are at least overlapped, while the plurality of second branches and the first pixel electrode are not overlapped.

16. A pixel array, comprising a plurality of pixel sets disposed on a substrate, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the substrate, wherein the first common electrode line is electrically connected to the at least a first main line, and the at least a first main line is electrically connected to the direct current; and at least a second main line disposed at another edge of the substrate, wherein the second common electrode line is electrically connected to the at least a second main line, and the at least a second main line is electrically connected to the alternating current, wherein the at least a first main line and the first common electrode lines are formed in a film layer, and the at least a second main line and the second common electrode lines are formed in another film layer.

17. The pixel array of claim 16, wherein a drain of the first active device is electrically connected to a source of the second active device.

18. The pixel array of claim 16, further comprising a connection line electrically connecting a drain of the first active device and a source of the second active device, the connection line being located between the first pixel electrode and the second pixel electrode.

19. The pixel array of claim 16, wherein:

the first common electrode line comprises a first common line and a plurality of first branches connected to the first common line, the first common line being arranged substantially in parallel to the first scan line, the plurality of first branches being perpendicular to the first common line;

the second common electrode line comprises a second common line and a plurality of second branches connected to the second common line, the second common line being arranged substantially in parallel to the second scan line, the plurality of second branches being perpendicular to the second common line, wherein the plurality of first branches and the first pixel electrode are at least overlapped, while the plurality of first branches and the second pixel electrode are not overlapped.

20. The pixel array of claim 16, wherein:

the first common electrode line comprises a first common line and a plurality of first branches connected to the first common line, the first common line being arranged substantially in parallel to the first scan line, the plurality of first branches being perpendicular to the first common line;

the second common electrode line comprises a second common line and a plurality of second branches connected to the second common line, the second common line being arranged substantially in parallel to the second scan line, the plurality of second branches being perpendicular to the second common line, wherein the plurality of second branches and the second pixel electrode are at least overlapped, while the plurality of second branches and the first pixel electrode are not overlapped.

21. A method for driving the pixel array of claim 16, the method comprising:

inputting a direct voltage to the first common electrode line and inputting an alternating voltage to the second common electrode line;

turning on the second active device and charging the second pixel electrode, wherein a waveform of the alternating voltage at the second common electrode line is converted from a high voltage level to a low voltage level; and turning off the second active device, wherein the waveform of the alternating voltage at the second common electrode line is converted from the low voltage level to the high voltage level.

22. The method of claim 21, wherein the alternating voltage at the first common electrode line is adjustable.

23. The method of claim 21, wherein an oscillation range of the alternating voltage is from about −10V to about 10V.

24. A pixel array, comprising a plurality of pixel sets disposed on a substrate, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the substrate, wherein the first common electrode line is electrically connected to the at least a first main line, and the at least a first main line is electrically connected to the direct current; and at least a second main line disposed at another edge of the substrate, wherein the second common electrode line is electrically connected to the at least a second main line, and the at least a second main line is electrically connected to the alternating current, wherein the at least a first main line, the first common electrode lines, and the second common electrode lines are formed in a film layer, and the at least a second main line is formed in another film layer.

25. The pixel array of claim 24, wherein a drain of the first active device is electrically connected to a source of the second active device.

26. The pixel array of claim 24, further comprising a connection line electrically connecting a drain of the first active device and a source of the second active device, the connection line being located between the first pixel electrode and the second pixel electrode.

27. The pixel array of claim 24, wherein:

the first common electrode line comprises a first common line and a plurality of first branches connected to the first common line, the first common line being arranged substantially in parallel to the first scan line, the plurality of first branches being perpendicular to the first common line;

the second common electrode line comprises a second common line and a plurality of second branches connected to the second common line, the second common line being arranged substantially in parallel to the second scan line, the plurality of second branches being perpendicular to the second common line, wherein the plurality of first branches and the first pixel electrode are at least overlapped, while the plurality of first branches and the second pixel electrode are not overlapped.

28. The pixel array of claim 24, wherein:

the first common electrode line comprises a first common line and a plurality of first branches connected to the first common line, the first common line being arranged substantially in parallel to the first scan line, the plurality of first branches being perpendicular to the first common line;

the second common electrode line comprises a second common line and a plurality of second branches connected to the second common line, the second common line being arranged substantially in parallel to the second scan line, the plurality of second branches being perpendicular to the second common line, wherein the plurality of second branches and the second pixel electrode are at least overlapped, while the plurality of second branches and the first pixel electrode are not overlapped.

29. A method for driving the pixel array of claim 24, the method comprising:

inputting a direct voltage to the first common electrode line and inputting an alternating voltage to the second common electrode line;

turning on the second active device and charging the second pixel electrode, wherein a waveform of the alternating voltage at the second common electrode line is converted from a high voltage level to a low voltage level; and turning off the second active device, wherein the waveform of the alternating voltage at the second common electrode line is converted from the low voltage level to the high voltage level.

30. The method of claim 29, wherein the alternating voltage at the first common electrode line is adjustable.

31. The method of claim 29, wherein an oscillation range of the alternating voltage is from about −10V to about 10V.

32. A display panel, comprising:

a first substrate comprising a pixel array disposed thereon, the pixel array comprising a plurality of pixel sets, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the substrate, wherein the first common electrode line is electrically connected to the at least a first main line, and the at least a first main line is electrically connected to the direct current; and at least a second main line disposed at another edge of the substrate, wherein the second common electrode line is electrically connected to the at least a second main line, and the at least a second main line is electrically connected to the alternating current, wherein the at least a first main line and the first common electrode lines are formed in a film layer, and the at least a second main line and the second common electrode lines are formed in another film layer;

a second substrate disposed opposite to the first substrate; and a display medium, sandwiched between the first substrate and the second substrate.

33. The display panel of claim 32, wherein a drain of the first active device is electrically connected to a source of the second active device.

34. The display panel of claim 32, further comprising a connection line electrically connected with a drain of the first active device and a source of the second active device, the connection line being located between the first pixel electrode and the second pixel electrode.

35. The display panel of claim 32, wherein:

the first common electrode line comprises a first common line and a plurality of first branches connected to the first common line, the first common line being arranged substantially in parallel to the first scan line, the plurality of first branches being substantially perpendicular to the first common line; and the second common electrode line comprises a second common line and a plurality of second branches connected to the second common line, the second common line being arranged substantially in parallel to the second scan line, the plurality of second branches being substantially perpendicular to the second common line, wherein the plurality of first branches and the first pixel electrode are at least overlapped, while the plurality of first branches and the second pixel electrode are not overlapped 36. The display panel of claim 32, wherein:

the first common electrode line comprises a first common line and a plurality of first branches connected to the first common line, the first common line being arranged substantially in parallel to the first scan line, the plurality of first branches being substantially perpendicular to the first common line; and the second common electrode line comprises a second common line and a plurality of second branches connected to the second common line, the second common line being arranged substantially in parallel to the second scan line, the plurality of second branches being substantially perpendicular to the second common line, wherein the plurality of second branches and the second pixel electrode are at least overlapped, while the plurality of second branches and the first pixel electrode are not overlapped.

37. A display panel, comprising:

a first substrate comprising a pixel array disposed thereon, the pixel array comprising a plurality of pixel sets, each of the pixel sets comprising:

a first scan line and a second scan line arranged in parallel;

a data line perpendicular to the first scan line and the second scan line;

a first active device electrically connected to the first scan line and the data line;

a second active device electrically connected to the second scan line and the first active device;

a first pixel electrode electrically connected to the first active device;

a second pixel electrode electrically connected to the second active device;

a first common electrode line disposed under the first pixel electrode and electrically connected to a direct current, a first storage capacitance being generated between the first common electrode line and the first pixel electrode;

a second common electrode line disposed under the second pixel electrode and electrically connected to an alternating current, a second storage capacitance being generated between the second common electrode line and the second pixel electrode;

at least a first main line disposed at an edge of the first substrate, wherein the first common electrode line is electrically connected to the at least a first main line, and the at least a first main line is electrically connected to the direct current; and at least a second main line disposed at another edge of the first substrate, wherein the second common electrode line is electrically connected to the at least a second main line, and the at least a second main line is electrically connected to the alternating current, wherein the at least a first main line, the first common electrode lines, and the second common electrode line is formed in a film layer, and the at least a second main line is formed in another film layer;

a second substrate disposed opposite to the first substrate; and a display medium, sandwiched between the first substrate and the second substrate.

38. The display panel of claim 37, wherein a drain of the first active device is electrically connected to a source of the second active device.

39. The display panel of claim 37, further comprising a connection line electrically connected with a drain of the first active device and a source of the second active device, the connection line being located between the first pixel electrode and the second pixel electrode.

40. The display panel of claim 37, wherein:

the first common electrode line comprises a first common line and a plurality of first branches connected to the first common line, the first common line being arranged substantially in parallel to the first scan line, the plurality of first branches being substantially perpendicular to the first common line; and the second common electrode line comprises a second common line and a plurality of second branches connected to the second common line, the second common line being arranged substantially in parallel to the second scan line, the plurality of second branches being substantially perpendicular to the second common line, wherein the plurality of first branches and the first pixel electrode are at least overlapped, while the plurality of first branches and the second pixel electrode are not overlapped.

41. The display panel of claim 37, wherein:

the first common electrode line comprises a first common line and a plurality of first branches connected to the first common line, the first common line being arranged substantially in parallel to the first scan line, the plurality of first branches being substantially perpendicular to the first common line; and the second common electrode line comprises a second common line and a plurality of second branches connected to the second common line, the second common line being arranged substantially in parallel to the second scan line, the plurality of second branches being substantially perpendicular to the second common line, wherein the plurality of second branches and the second pixel electrode are at least overlapped, while the plurality of second branches and the first pixel electrode are not overlapped.

* * * * *